United States Patent [19]

Toyokawa

[11] Patent Number: 4,901,363

[45] Date of Patent: Feb. 13, 1990

[54] SYSTEM FOR COMPRESSING BI-LEVEL DATA

[75] Inventor: Kazuharu Toyokawa, Yamato, Japan

[73] Assignee: International Business Machines Corporation, Armonk, N.Y.

[21] Appl. No.: 250,596

[22] Filed: Sep. 28, 1988

Related U.S. Application Data

[63] Continuation of Ser. No. 185,332, Apr. 21, 1988, abandoned, which is a continuation of Ser. No. 891,813, Jul. 31, 1986, abandoned.

[30] Foreign Application Priority Data

Jul. 31, 1985 [JP] Japan .................................. 60-167868

[51] Int. Cl.$^4$ .............................................. G06K 9/36
[52] U.S. Cl. .................................... 382/56; 358/261.2; 358/456; 358/462; 382/52
[58] Field of Search ........................ 382/50, 52, 55, 56; 358/260, 261.2, 283, 429, 455, 456, 462, 426

[56] References Cited

U.S. PATENT DOCUMENTS

| | | | |
|---|---|---|---|
| 4,204,232 | 5/1980 | Mizuno | 382/56 |
| 4,229,768 | 10/1980 | Kurahayashi et al. | 382/56 |
| 4,325,085 | 4/1982 | Gooch | 382/56 |
| 4,425,582 | 1/1984 | Kadakia et al. | 382/260 |

FOREIGN PATENT DOCUMENTS 0103773 3/1984 European Pat. Off. .

OTHER PUBLICATIONS

Dinstein et al., "Fast Discrimination Between Homogeneous and Texture Regions", *IBM Tech. Disc. Bulletin*, vol. 26, No. 12, 5/1984, pp. 6524–6526.

Anastassiou, "Digital Halftoning Using Biased Error Diffusion", *IBM Tech. Disc. Bulletin*, vol. 26, No. 10B, 3/1984, pp. 5723–5727.

Yoshida et al., "Pel Pattern Predictive Coding of Dithered Images", *IEEE Int. Conf. on Comm.: Integrating Communication for World Progress*, 6/1983, vol. 1, pp. 463–467.

Langdon, Jr., "An Intro. to Arithmetic Coding", *IBM Journal of Research and Development*, vol. 28, #2, 3/1984, pp. 135–149.

Langdon, Jr. et al., "Compression of Black-White Image with Arithmetic Coding", *IEEE Trans. on Comm.*, vol. COM-29, No. 6, 6/1981, pp. 858–867.

Primary Examiner—Leo H. Boudreau
Assistant Examiner—Joseph Mancuso
Attorney, Agent, or Firm—Thomas P. Dowd

[57] ABSTRACT

A system is disclosed for arithmetically compressing bi-level data of an image by sampling history pels, which are adjacent pels to a current pel to be processed, and pels so separated from the adjacent pels as to adapt to a period of a dither matrix for a dither image. From the sampled pels it is determined whether the sampled image has a dither dominant image pattern or a text-graphic dominant image pattern and an appropriate signal is generated, a first signal representing that the image has the dither dominant image pattern, a second signal representing that the image has the text-graphic dominant image pattern, and a third signal representing that the image is not classified as either of these image patterns. The first, second and third signals are applied to an up-down counter which accumulates the occurrences of the signals to produce, when the accumulated value exceeds an upper threshold or a lower threshold, a control signal for selectively switching access to first and second statistical tables, which store, at each entry, the more probable symbol and the probability of the less probable symbol for the image of the text-graphic image and the dither image, respectively.

12 Claims, 2 Drawing Sheets

SYSTEM FOR COMPRESSING BI-LEVEL DATA

CROSS-REFERENCES

This is a continuation of U.S. application Ser. No. 07/185,332, filed Apr. 21, 1988, which in turn was a continuation of U.S. applications Ser. No. 06/891,813, filed July 31, 1986, both now abandoned.

1. Field of the Invention

The present invention relates to a system and method for compressing bi-level data and more particularly to a data compression system using an arithmetic coding.

2. Prior Art

Adaptive binary arithmetic coding has been suggested for compressing and decompressing bi-level data or signals, each of which represents one pel of a text/graphic image. Arithmetic coding is described in Reference (1), Glen G. Langdon, Jr. "An Introduction to Arithmetic Coding:", IBM Journal of Research and Development, Vol. 28, No. 2, March 1984, pp. 135–149, and Reference (2), Glen G. Langdon, Jr. and Jorma Rissanen, "Compression of Black-White Image with Arithmetic Coding", IEEE Transactions in Communications, Vol. COM-29, No. 6, June 1981, pp. 858–867. The known bi-level arithmetic coding scheme utilizes a statistical prediction of whether a currently considered pel is black or white, e.g., "1" or "0". The more the prediction is correct, the higher is the resultant data compression efficiency. For predicting black or white at the currently considered pel position "X", the information of neighboring previously considered pels is important. The sampling area of the previous pels is called a "template". FIG. 2 shows a 7 bit template model as in the reference (2). The template or sample window 1 and the current bit or pel "X" to be processed are shown. The first step of the arithmetic coding is to sample the bi-level data or bits of the pels "A" through "G". The next step is to access a statistical table by using the bit pattern of the pels "A" through "G" as an address. The statistical table stores in each entry the more probable symbol or bit generated, based upon the bit pattern of the pels "A" through "G", and the probability of the less probable symbol or bit. The current pel "X" is compared with the more probable symbol in the accessed entry. If they are equal, a YES signal is generated; and, if not equal, a NO signal is generated. In the next step, the YES or NO signal and the probability of the less probable symbol are supplied to a coding means which calculates a composite probability or code string. The more probable symbol and the probability of the less probable symbol in the accessed entry are modified in accordance with the number of occurrences of the YES signal and occurrences of the NO signal. Decompression of the original dot pattern from the code string is performed by steps of the reverse sequence from that of the coding steps.

PROBLEMS OF THE PRIOR ART

The prior template model 1 for the black and white pels is an effective data compression model in conjunction with the adaptive arithmetic coding scheme, as disclosed in the cited Langdom references. However, when the scheme is used for a dither image or a mixed image consisting of text/graphic and dither images, the resultant data compression rate id degraded for the following reasons (although it is still better than other static coding coding schemes, such as the modified READ scheme). In the case of the text/graphic image, the current bit "X" is well correlated to the neighboring pels, especially to the nearest neighbors "B", "C", "D" and "G". The current bit "X", accordingly, is well predicted by the bit information of the seven bit template 1. In a dither image, however, the correlation develops a periodicity determined by the size of a dither threshold matrix. So, in a halftone image wherein local halftone density is slowly varying, and the dither matrix is 4×4, for example, the current pel "X" is rather correlated to that in the 4 bit previous position "Y" in FIG. 2. This effect is called a delocalization of bit correlation. The prior template 1 shown in FIG. 2 is not effective to predict a next coming pel in a dither image, due to the delocalization. Thus the compression efficiency is drastically degraded.

Another problem in arithmetic coding using the prior template 1 shown in FIG. 2 occurs in the compression of a mixed image, having text/graphic and dither image portions, for the following reasons. In arithmetic coding, the current pel "X" is predicted based upon a probability of the less probable symbol, which is determined by "1" and "0" of the history pels, as shown in Table 1.

TABLE 1

| STATE (ENTRY) | MORE PROBABLE SYMBOL | | | PROBABILITY OF LESS PROBABLE SYMBOL |
|---|---|---|---|---|
| ABCDEFG | X = '0' | X = '1' | Total | |
| 0 0 0 0 0 0 0 | 100 | 1 | 101 | 0.0099 |
| 0 0 0 0 0 0 1 | 20 | 50 | 70 | 0.286 |
| 0 0 0 0 0 1 0 | 8 | 1 | 9 | 0.111 |
| 0 0 0 0 0 1 1 | 15 | 1 | 16 | 0.0625 |

The point to be considered is that bit pattern statistics in a dither image are quite different from that in a text/graphic image, so that the resultant probability of the less probable symbol of the dither image is quite different from that of the text/grapic image.

Adaptive arithmetic coding updates the probability of the less probable symbol based upon the recent bit pattern of the history pels, as described hereinbefore. Such update, however, is too slow to follow frequent change from the text/graphic image to the dither image and vice versa in documents ion the real world. That is, the slow adaptation in the prior arithmetic coding scheme cannot follow such a frequent switching between the text/graphic and dither images. Further, it has been noted by the inventor that the bit patterns of the history pels are common to both the text/graphic and dither images, but the probability of the less probable symbols of the bit patterns common to both images are different from each other. This is called 'state overlap', hereinafter. The prior arithmetic coding scheme inherently has slow adaptation and state overlap, whereby the resultant data compression efficiency for the mixed image is degraded.

SUMMARY OF THE INVENTION

The present invention is directed to solving both problems, i.e., the "delocalization" and the "state overlap", and can compress the mixed image effectively. To this end, the invention introduces a new template or sample window taking into consideration the delocalized bit correlation, and a rapid adaptation scheme to solve the problem of "state overlap". The template of the invention is so arranged as to sample previously processed pels or history pels, which are adjacent pels to the current pel, selected in order to adapt to the text/graphic image, as well as pels so separated from the adjacent pels as to adapt to a period of dither matrix. The image pels of the scan line are sequentially processed, so that the template is sequentially moved along the scan lines. For each movement of the template, the image or the bit pattern of the sampled history pels is used to determine which of the dither dominant image pattern or the text/graphic dominant image pattern the image being sampled has. More particularly, one of a first, second or third signal is generated as a result of the determination. The first signal represents that the image has the dither dominant image pattern, the second signal represents that the image has the text/graphic dominant image pattern, and the third signal represents that the image is not classified as either the dither dominant image pattern or the text/graphic dominant image pattern. The number of occurrences of the first, second and third signals are accumulated to control selective switching of access to one of the following two statistical tables. The first table stores, at each entry, the more probable symbol and the probability of the probable symbol for the test/graphic image, and the second table stores, at each entry, the more probable symbol and the probability of the less probable symbol for the dither image.

The bit of the current pel is compared with the more probable symbol in the addressed entry of the selected table. The result of the comparison is supplied to the coding means along with the probability of the less probable symbol in the entry. Then, the coding means produces coded data, and the more probable symbol and the probability of the less probable symbol in the addressed entry are updated.

DESCRIPTION OF THE PREFERRED EMBODIMENT

In describing the preferred embodiment of the present invention, it is assumed for convenience of description that the dither image is generated with a 4 by 4 matrix, although the invention can be applied to any images generated by dither matrices with arbitrary size and threshold patterns. Also, the invention is described hereinafter utilizing a 7 bit template, but it will be understood that the invention can be applicable to larger template sizes. To enlarge the template, however will require increasing the size of the statistical table of the arithmetic coder. The 7 bit template is one of a practical size in the trade-off between compression efficiency and cost of the coder.

Figure 1:
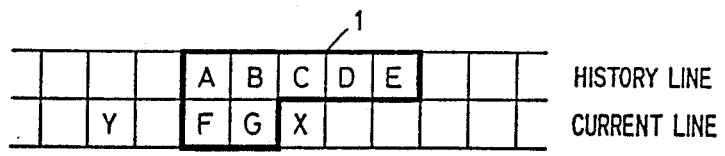
FIG. 1 shows a template in accordance with the present invention

FIG. 1 shows the template 2 of the present invention. The template 2 samples the history pels "A", "B", "C", "D", "E", "F" and "G" in a history line and a current line. The pels "B", "C" , "D" and "G" are adjacent pels to the current pel "X" to be processed, and the pels "A", "E" and "F" are separated from the adjacent pels. Particularly, the pels "A" and "E" are so separated from the pels "D" and "G", respectively, as to adapt to a period of the 4×4 dither matrix. The sampled previous 7 bits are used to determine whether the bit pattern or image of the 7 bits should be treated as a text/graphic image or a dither image, or neither.

By way of describing the manner in which the determination is carried out, 128 bit patterns represented by the 7 bits are classified into a dither dominant group, a text/graphic dominant group or a remaining group which does not belong to the dither dominant and the text/graphic dominant groups.

In the case of the dither image, every 4th pel will correlate owing to the delocalization, and the following case is statistically frequent:

$$\text{bit "A"} = \text{bit "D"} \tag{1}$$

$$\text{bit "E"} = \text{bit "G"} \tag{2}$$

On the other hand, the correlation is well localized in the text/graphic image, and the following case is statistically dominant:

$$\text{bit "B"} = \text{bit "C"} = \text{bit "G"} \tag{3}$$

Using the conditions (1), (2) and (3), the dither dominant states (patterns) and the text/graphic dominant states among the 128 states or patterns of the 7 bits "A" through "G" are defined, as follows.

DITHER DOMINANT PATTERNS

Consider a numeric P="ABCDEFG" bits, and n is 0 or positive integers.

In the case of $$P \leq 64 \text{ and } P = 16n \text{ or } 16n+2 \text{ for } A=D=E=G=0$$

$$P \leq 0,2,16,18,32,34,48,50$$

In the case of $$P \leq 64 \text{ and } P = 16n+5 \text{ or } 16n+7 \text{ for } A=D=0; E=G=1$$

P:5,7,21,23,37,39,53,55

In the case of $$P \leq 64 \text{ and } P = 16n+8 \text{ or } 16n+10 \text{ for } A=D=1; E=G=0$$

P: 72,74,88,90,104,106,120,122

In the case of $$P \leq 64 \text{ and } P = 16n+15 \text{ for } A=D=E=G=1$$

P:77,79,93,95,109,111,124,127

In this manner, 32 dither dominant states or patterns are defined.

It is noted, however, that the underlined states are not used as the dither dominant patterns, as described hereinbelow.

TEXT/GRAPHIC DOMINANT PATTERNS

In the case of $$0 \leq P \leq 16 \text{ and } P = \text{even for } B=C=G=0$$

P: 0,,4,6,8,10,12,14

In the case of $$64 \leq P \leq 80 \text{ and } P = \text{even for } B=C=G=0$$

P: 66,68,70,, 74,76,78
In the case of $48 \leq P \leq 64$ or $112 \leq P$ and P=odd for B=C=G=1

P: 49,51,53,55,57,59,61,63,113,115, 117,119,121,123,125,127

In this manner, 32 text/graphic dominant states are defined.

It is noted, however, that the underlined states are not used as the text/graphic dominant patterns, as described hereinbelow.

Among the number P, the following eight states or patterns are common to both the dither dominant and text/graphic patterns
P: 0,2,53,55,62,74,125,127

These numbers are shown as underlined in the above, and these satisfy the above conditions for the dither and text/graphic dominant states. Explaining about "0" and "72", for example;

|  | 64 | 32 | 16 | 8 | 4 | 2 | 1 |
|---|---|---|---|---|---|---|---|
|  | A | B | C | D | E | F | G |
| P = 0 | 0 | 0 | 0 | 0 | 0 | 0 | 0 |
| P = 72 | 1 | 0 | 0 | 1 | 0 | 0 | 0 |

"0" satisfies "A=D=E=G=0" or the conditions (1) and (2) for the dither image, and also satisfies "B=C=G=0" or the condition (3) for the text/graphic image. "72" satisfies "A=D=1; E=G=0" or the conditions (1) and (2) for the dither image, and also satisfies "B=C=G=O" or the condition (3) for the text/graphic image.

Finally, 24 states (32−8=24) are chosen in both states for determining whether the bit pattern P sampled by the template 2 belongs to the dither dominant patterns or the text/graphic patterns.

Figure 3:
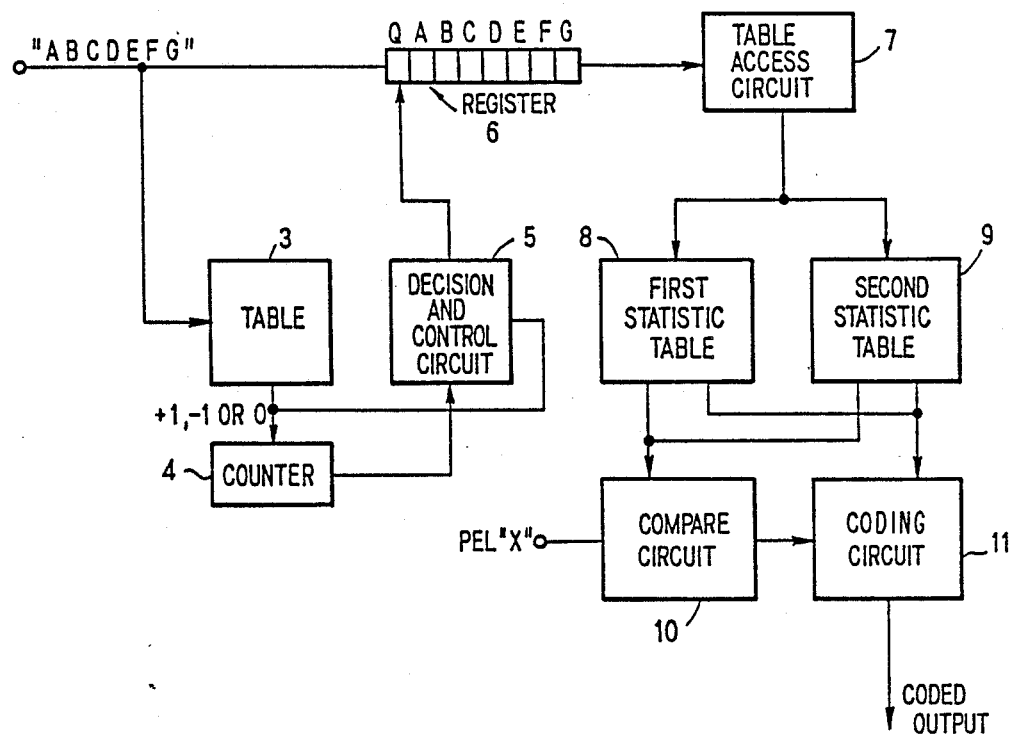
FIG. 3 shows a block diagram of a system for performing the improved data compression of the present invention.

Referring to FIG. 3, a system is shown for making the determination for a seven bit pattern using a table 3. For each sample of the seven bits by the template 2, the seven bits are supplied to a register 6 and the table 3. The seven bits are used as an address for accessing the table 3. The following Table 2 partially shows the contents of the table 3 of FIG. 3.

TABLE 2

| ADDRESSES ABCDEFG | CONTENTS |
|---|---|
| 0000000 (P = 0) | 0 |
| 0000000 (P = 1) | 0 |
| 0000000 (P = 2) | 0 |
| 0010000 (P = 16) | +1 |
| 0010001 (P = 17) | 0 |
| 1000000 (P = 64) | −1 |
| 1011000 (P = 88) | +1 |
| 1110111 (P = 119) | −1 |
| 1111111 (P = 127) | 0 |

If the pattern of the sampled seven bits is of dither dominant states as in the case of P=16 are 88, for example, the "+1" output is read out of the table 3. If the sampled seven bits are of text/graphic dominant states as in the case of P=64 and P=119, the "−1" output is read out. For the states other than these states, the "0" output is read out.

The invention basically switches, after a dither or a text/graphic image occurs, the access to the first and second statistical tables 8 and 9. The first table 8 stores, at each entry, the more probable symbol and the probability of the less probable symbol for the seven bit pattern of the text/graphic image, and the second statistical table 9 stores, at each entry, the more probable and the probability of the less probable symbol for the seven bit pattern of the dither image. In a real image in a document, the 7 bit pattern may accidentally match to a dither dominant pattern although the 7 bit pattern is in the text image, and vice versa. Such a fluctuation can be removed by introducing a hysteresis in the switching operation, as follows.

A counter 4 and a decision and control circuit 5 are provided between the table 3 and the register 6. The counter 4 counts up whenever the "+1" output is applied, and counts down whenever the "−1" output is applied, and stays at its value when the "0" output is applied.

Also, the invention introduces an upper and a lower threshold for the count value. The decision and control circuit 5 determines whether the count value has reached the upper threshold or the lower threshold, or not. When the count value is equal to or larger than the upper threshold, the decision and control circuit 5 supplies "1" to the position "Q" of the register 6, and causes the count value to be equal to the upper threshold value. When the count value is equal to or smaller than the lower threshold, the decision and control circuit 5 supplies "0" to the position "Q" of the register 6, and causes the counter value to be equal to the lower threshold. Otherwise, the bit in the position "Q" is not changed. The upper and lower thresholds are determined or selected empirically to maximize the compression efficiency.

In this manner, the number of occurrences of the text/graphic dominant states and the dither states is accumulated for controlling the switch of the access to the first and second statistical tables, whereby the above-stated fluctuation is removed.

The eight bits including the bit "Q" and seven bits "A" through "G" are supplied from the register 6 to the table access 7, which switches the access operation to the first and second statistical tables 8 and 9 in response to the value of the bit "Q".

The selected statistical table is accessed by use of the seven bits as an address. The more probable bit or symbol in the addressed entry is supplied to a compare circuit 10, which compress the more probable bit with the current bit "X". If equal, a YES signal is supplied to a coding circuit 11, and if not equal, a NO signal is supplied to the coding circuit 11. Also, the coding circuit 11 receives the probability of the less probable bit from the addressed entry, and calculates the composite probability of the coded output. And, the most probable bit and the probability of less probable bit in the entry are updated. These calculations and the update are described in the above-cited Langdon references, and are not described herein.

EFFECT OF THE INVENTION

To evaluate the efficiency achieved by the present invention, compression rates for the present invention and the prior methods were stimulated. Three kinds of test charts were used. The first chart was CCITT's test chart No. 1, called as Test chart hereinbelow. The second chart was the text chart of The Institutes of Image Electronics Engineers of Japan, and called as Dither chart. The third chart was IEEE's Facsimile Test Chart "IEEE Std 167A-1980" which includes text, graphic and dither images, and called as Mixed Chart.

The entropy on adapting to stationary statistics is defined as follows. Assuming that there are N states in a template model under consideration, n(k) is the probability of "0" in state k, and p(k) is the probability of "0" in state k. Then entropy H of the image data is:

$$H = \sum_{k=0}^{H} n(k) \log_2[1/p(k)] + \sum_{k=0}^{N} n(k) \cdot [1 - p(k)] \log_2 [1/(1 - p(k))].$$

The entropy is very close to the actual data compressed data volume according to the arithmetic coding scheme as shown in the reference (2). The slow adaptation scheme was not used to evaluate the several template models here. The slow adaptation can be utilized in addition to the fast adaptation of the invention at the same time, and it will help to improve the compression about 10% as compared with the entropy on static adaptation as shown in the reference (2). However, the entropy is a good measure to evaluate the prediction models in general, and especially very close to the real compressed data volume in the arithmetic coding scheme.

So the entropy to evaluate the model efficiency was used.

As shown in Table 3, the calculated entropies are compared with original data and compressed data volumes with the modified READ scheme. The data in the last colume was obtained using the present invention, where the template is the 7 bit template B, and the adaptive switching scheme was used with the hysteresis parameter: UPPER=2 and LOWER=2.

TABLE 3

Figure 2:
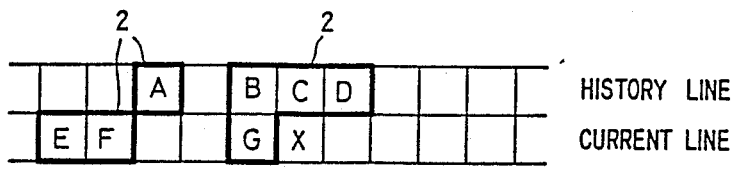
FIG. 2 shows a template used in the prior arithmetic coding.

|  | ORIGINAL | MR | PRIOR ARITHMETIC CODING WITH TEMPLATE 1 (FIG. 2) | PRESENT INVENTION |
|---|---|---|---|---|
| TEXT CHART | 2,820,096 Bits | 180,-460 Bits | 134,801 Bits | 133,462 Bits |
|  | (15.63) | (20.92) | (21.13) |  |
| DITHER CHART | 580,608 | 581,616 | 257,230 | 77,049 |
|  | (1.00) | (2.26) | (7.54) |  |
| MIXED CHART | 2,428,416 | 1,039,286 | 615,723 | 347,938 |
|  | (2.34) | (3.94) | (6.98) |  |

The result shows that the present invention can improve the compression efficiency in both the dither picture and the mixed document drastically. This improvement is realized by the present invention through the introduction of the new template model taking into consideration the delocalization of bit correlations in the dither image and the localization of bit correlations in the text/graphic image, and the introduction of the adaptive switching scheme to adapt to the different statistics between both images.

The improved scheme of the present invention can be implemented in software and hardware coder/decoders.

Having thus described our invention, what we claim as new and desire to secure by letters patent is:

1. A method for compressing a bi-level data stream representing an image, wherein each bit of bi-level data represents one pel of either a text/graphic dominant image pattern or a dither dominant image pattern, comprising the steps of:

processing the bits of bi-level data individually and successively in lines of pels forming the image, by sampling previously processed pels which comprise:
  adjacent pels to the current pel being processed; and
  pels so separated from said adjacent pels as to adapt to a period of a dither matrix for a dither dominant image pattern;
determining the bi-level data of said adjacent pels and said separated pels for identifying during said processing the type of image pattern represented by said adjacent pels and said separated pels as either a text/graphic dominant image or a dither dominant image pattern;
selectively accessing a respective one of a first and a second statistical table in accordance with said determination by using said bi-level data of said adjacent pels and said separated pels as an address for the table respectively selected to be accessed;
storing at each entry in the respective table being selectively accessed the more probable symbol and the probability of the less probable symbol for said respective bi-level data of said address;
comparing the bi-level data of said current pel with said more probable symbol in said respective addressed entry;
producing coded data in accordance with said comparison and said probability of less probable symbol in said respective addressed entry; and
modifying said more probable symbol and said probability of less probable symbol in said respective addressed entry.

2. A method as in claim 1, wherein said determining step comprises generating a first signal when a dither dominant image pattern is identified, and generating a second signal when a text/graphic dominant image pattern is identified.

3. A method as in claim 2, wherein said first and second signals are accumulated in an up-down counter which generates one signal when accumulated occurrences reach one threshold and another signal when said accumulated occurrences reach another threshold, and said one signal and another signal are used to selectively access a respective one of said first and second statistical tables.

4. A method as in claim 1, wherein said adjacent pels and said separated pels are distributed in a previous line and a current line containing the current pel being processed.

5. A method as in claim 4, wherein said adjacent pels comprise:

three pels in said previous line, adjacent to each other, and with one of said pels above, one to the right of, and one to the left of said current pel; and the immediately preceding pel is said current line, located below said left pel.

6. A method as in claim 5, wherein said separated pels comprise three pels, one of said three pels being in said previous line and two being adjacent pels in said current line preceding said current pel, with the pel of said two that is closer to said current pel located adjacent to the pel in said current line below said one pel in said previous line, and with said one pel in said previous line and said other of said two pels in said current line being separated from said right pel and said immediately preceding pel, respectively, so as to adapt to said period of said dither matrix.

7. A system for compressing a bi-level data stream representing an image, wherein each bit of bi-level data represents one pel of either a text/graphic dominant image pattern or a dither dominant image pattern, comprising:

means for processing the bits of bi-level data individually and successively in lines of pels forming the image, by sampling previously processed pels which comprise:
adjacent pels to the current pel being processed; and
pels so separated from said adjacent pels as to adapt to a period of a dither matrix for a dither dominant image pattern;
means for determining the bi-level data of said adjacent pels and said separated pels for identifying during said processing the type of image pattern represented by said adjacent pels and said separated pels as either a text/graphic dominant image or a dither dominant image pattern and producing an output in accordance therewith;
first and second statistical tables;
means for selectively accessing a respective one of said first and second statistical tables in accordance with the output of said determining means by using said bilevel data of said adjacent pels as an address for the table respectively selected to be accessed;
means for storing at each entry in the respective table being selectively accessed the more probable symbol and the probability of the less probable symbol for said respective bi-level data of said address;
means for comparing the bi-level data of said current pel with said more probable symbol in said respective addressed entry;
means for producing coded data in accordance with said comparison and said probability of less probable symbol in said respective addressed entry; and
means for modifying said more probable symbol and said probability of less probable symbol in said respective addressed entry.

8. A system as in claim 7, wherein said determining means comprises means for generating a first signal when a dither dominant image pattern is identified, and for generating a second signal when a text/graphic dominant image pattern is identified.

9. A system as in claim 8, further comprising up-down counter means for accumulating said first and second signals and generating one signal when accumulated occurrences reach one threshold and another signal when said accumulated occurrences reach another threshold, and means for using said one signal and another signal to selectively access a respective one of said first and second statistical tables.

10. A system as in claim 7, wherein said processing means comprises template means for distributing said adjacent pels and said separated pels in a previous line and a current line containing the current pel being processed.

11. A system as in claim 10, wherein adjacent pels comprise:
three pels in said previous line, adjacent to each ther, and with one of said pels above, one to the right of, and one to the left of said current pel; and the immediately preceding pel in said current line, located below said left el.

12. A system as in claim 11, wherein said separated pels comprise three pels, one of said three pels being in said previous line and two being adjacent pels in said current line preceding said current pel, with the pel of said two that is closer to said current pel located adjacent to the pel in said current line below said one pel in said previous line, and with said one pel in said previous line and said other of said two pels in said current line being separated from said right pel and said immediately preceding pel, respectively, so as to adapt to said period of said dither matrix.

* * * * *